US012212050B2

(12) United States Patent
Sone

(10) Patent No.: US 12,212,050 B2
(45) Date of Patent: Jan. 28, 2025

(54) ANTENNA DEVICE FOR VEHICLE

(71) Applicant: Yokowo Co., Ltd., Tokyo (JP)

(72) Inventor: Takayuki Sone, Tomioka (JP)

(73) Assignee: YOKOWO CO., LTD., Tokyo (JP)

( * ) Notice: Subject to any disclaimer, the term of this patent is extended or adjusted under 35 U.S.C. 154(b) by 183 days.

(21) Appl. No.: 17/277,736

(22) PCT Filed: Sep. 26, 2019

(86) PCT No.: PCT/JP2019/037788
§ 371 (c)(1),
(2) Date: Mar. 19, 2021

(87) PCT Pub. No.: WO2020/067253
PCT Pub. Date: Apr. 2, 2020

(65) Prior Publication Data

US 2021/0376457 A1 Dec. 2, 2021

(30) Foreign Application Priority Data

Sep. 28, 2018 (JP) ................................ 2018-183951

(51) Int. Cl.
*H01Q 1/32* (2006.01)
*H01Q 5/371* (2015.01)
*H01Q 21/08* (2006.01)

(52) U.S. Cl.
CPC .......... *H01Q 1/3275* (2013.01); *H01Q 5/371* (2015.01); *H01Q 21/08* (2013.01)

(58) Field of Classification Search
CPC ........ H01Q 1/3275; H01Q 5/357; H01Q 9/16; H01Q 9/44–46; H01Q 9/36–40; H01Q 9/26; H01Q 11/06; H01Q 11/14
See application file for complete search history.

(56) References Cited

U.S. PATENT DOCUMENTS 6,891,515 B1 * 5/2005 Langley ................ H01Q 5/371
343/895
10,553,952 B1 * 2/2020 Sternowski ............. H01Q 9/44
(Continued)

FOREIGN PATENT DOCUMENTS

CN 104300200 A 1/2015
CN 104868227 A 8/2015
(Continued)

OTHER PUBLICATIONS

International Search Report and Written Opinion mailed on Oct. 29, 2019, received for PCT Application PCT/JP2019/037788 filed on Sep. 26, 2019, 9 pages including English Translation.
(Continued)

*Primary Examiner* — Ricardo I Magallanes
(74) *Attorney, Agent, or Firm* — XSENSUS LLP

(57) ABSTRACT

An antenna device to be mounted on a vehicle includes an antenna base; and an antenna element erected on the antenna base, wherein the antenna element includes a proximal end portion fixed on a plane substantially perpendicular to the antenna base and two arm portions extending in directions away from each other from the proximal end portion, and wherein an inductance of at least one of the two arm portions is larger than an inductance of a planer conductor having a same material and a substantially same outer shape. In one embodiment, an inductance of one arm portion of the two arm portions is be smaller than an inductance of the other arm portion.

4 Claims, 8 Drawing Sheets

(56) References Cited

U.S. PATENT DOCUMENTS

| | | | | |
|---|---|---|---|---|
| 2004/0001031 | A1* | 1/2004 | Sugimoto | H01Q 1/36 343/702 |
| 2009/0079573 | A1* | 3/2009 | Jiang | H01Q 25/00 343/810 |
| 2011/0273360 | A1* | 11/2011 | Campero | H01Q 5/307 343/893 |
| 2012/0081253 | A1* | 4/2012 | Duzdar | H01Q 1/3275 343/713 |
| 2014/0285387 | A1* | 9/2014 | Lindenmeier | H01Q 1/27 343/713 |
| 2014/0292593 | A1 | 10/2014 | Thiam et al. | |
| 2015/0102974 | A1* | 4/2015 | Stoytchev | H01Q 5/371 343/843 |
| 2018/0159208 | A1* | 6/2018 | Ameri | H01Q 21/28 |
| 2021/0135341 | A1* | 5/2021 | Lindenmeier | H01Q 1/32 |
| 2021/0376457 | A1* | 12/2021 | Sone | H01Q 21/08 |

FOREIGN PATENT DOCUMENTS

| | | | | | |
|---|---|---|---|---|---|
| CN | 106532243 | A | * | 3/2017 | |
| CN | 211295369 | U | | 8/2020 | |
| DE | 10311040 | A1 | | 10/2004 | |
| DE | 102009038038 | A1 | * | 2/2011 | H01Q 1/3275 |
| JP | 2003-502894 | A | | 1/2003 | |
| JP | 2003-258527 | A | | 9/2003 | |
| JP | 2009-17116 | A | | 1/2009 | |
| JP | 2013-85308 | A | | 5/2013 | |
| KR | 102038558 | B1 | * | 3/2015 | H01Q 1/32 |
| KR | 101784706 | B1 | | 10/2017 | |
| WO | 2015/107983 | A1 | | 7/2015 | |

OTHER PUBLICATIONS

Extended European search report issued on Apr. 29, 2022, in corresponding European patent Application No. 19867386.5, 11 pages.

Office Action issued on May 27, 2023, in corresponding Chinese patent Application No. 201980061390.4, 9 pages.

* cited by examiner

ANTENNA DEVICE FOR VEHICLE

CROSS-REFERENCE TO RELATED APPLICATIONS

The present application is based on PCT filing PCT/JP2019/037788, filed Sep. 26, 2019, which claims priority to JP 2018-183951, filed Sep. 28, 2018, the entire contents of each are incorporated herein by reference.

TECHNICAL FIELD

The present invention relates to an antenna device for a vehicle that can be used at a plurality of frequency bands.

BACKGROUND ART

In recent years, the variety of functions of electronic communication devices mounted in vehicles has been increased, and, correspondingly with that, there has been an increased demand for an antenna device for a vehicle that can alone use a plurality of frequency bands. As an example of a conventional antenna device for a vehicle that meets such a demand, there is a two-frequency antenna disclosed in Patent Literature 1. The two-frequency antenna has a planer first element on a front surface of an insulative substrate erected on a ground (ground plane), a through hole in vicinity of a feeding part, a planer second element at a position which does not overlap with the first element of a back surface of the substrate, and a feeding line in continuity with the through hole.

Because the two-frequency antenna does not need a coil part because inductance caused in the two-frequency antenna having a low profile for mounting in a vehicle is compensated by the feeding line and because of the configuration having the two elements and the feeding line formed in a printed pattern on one substrate, an antenna device for a vehicle is advantageously acquired easily and inexpensively.

PRIOR ART DOCUMENTS

Patent Literature

Patent Literature 1: Japanese Patent Laid-Open No. 2013-85308

SUMMARY OF INVENTION

Problems to be solved by the Invention

In the above described two-frequency antenna, the two planer elements are disposed on the front surface and the back surface of one substrate such that the two planer elements do not overlap with each other, and one element transmits or receives one frequency band. Each of the elements has an area dependent on the size of the substrate. Therefore, in a case where the two-frequency antenna is applied to an antenna device for a vehicle, the antenna gain cannot be increased relatively in a low frequency band because the size of the substrate cannot be increased.

It is an object of the present invention to provide an antenna device for a vehicle which is small but has two frequency bands of a low frequency band and a frequency band higher than the low frequency band.

Solution to the Problems

An antenna device for a vehicle according to one aspect of the present invention includes an antenna base, and an antenna element erected on the antenna base. The antenna element includes a proximal end portion fixed on a plane substantially perpendicular to the antenna base and two arm portions extending in directions away from each other from the proximal end portion, and an inductance of at least one of the two arm portions is larger than an inductance of a planer conductor having a same material and a substantially same outer shape.

Advantageous Effect of the Invention

According to the present invention, an antenna device for a vehicle can be provided which is small but has two frequency bands of a low frequency band and a frequency band higher than the low frequency band.

DESCRIPTION OF EMBODIMENTS

An exemplary embodiment of the present invention is described below with reference to drawings.

Figure 1A:
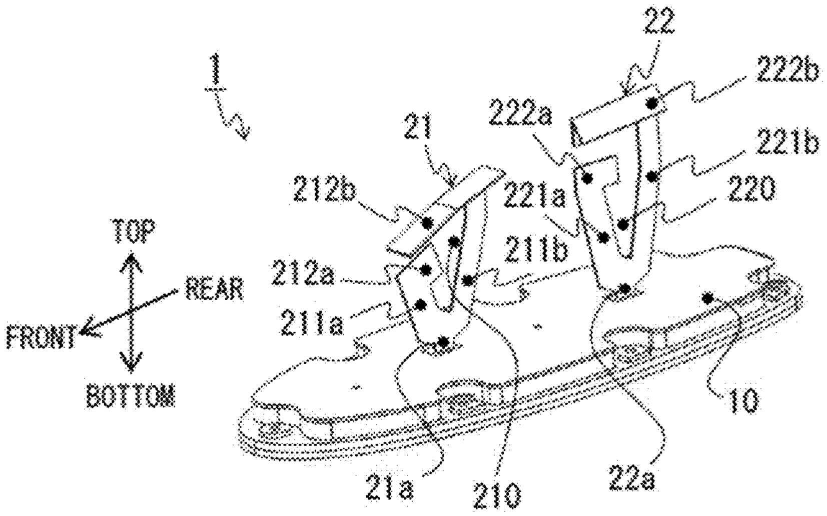
FIG. 1A is a perspective view for explaining a main structure of a vehicular antenna device 1 according to one embodiment.
Figure 1B:
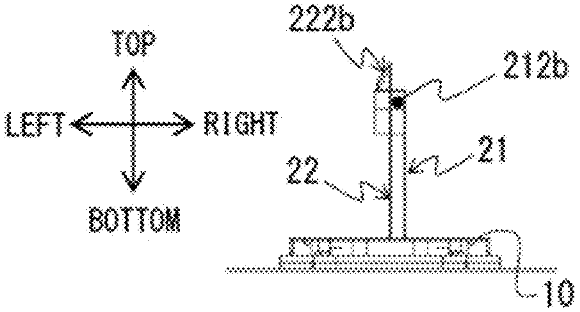
FIG. 1B is a rear view for explaining the main structure of the vehicular antenna device 1 according to the embodiment.
Figure 1C:
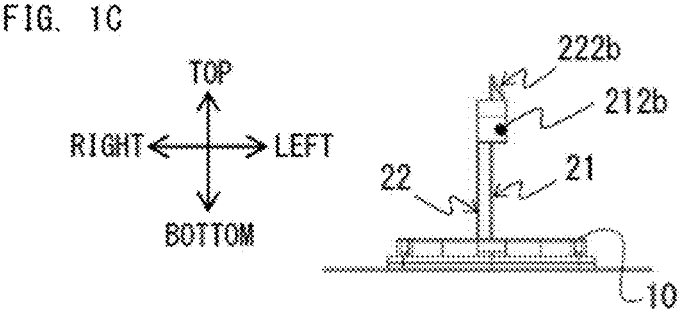
FIG. 1C is a front view for explaining the main structure of the vehicular antenna device 1 according to the embodiment.
Figure 1D:
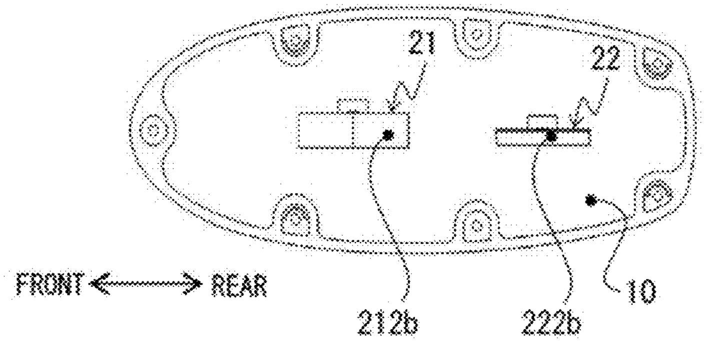
FIG. 1D is a top view for explaining the main structure of the vehicular antenna device 1 according to the embodiment.
Figure 2A:
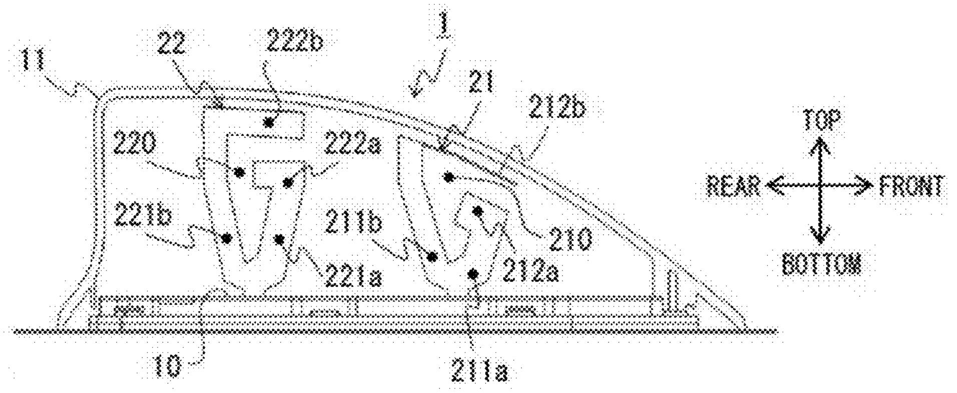
FIG. 2A is an explanatory diagram of an internal structure of the vehicular antenna device viewed from a right side.
Figure 2B:
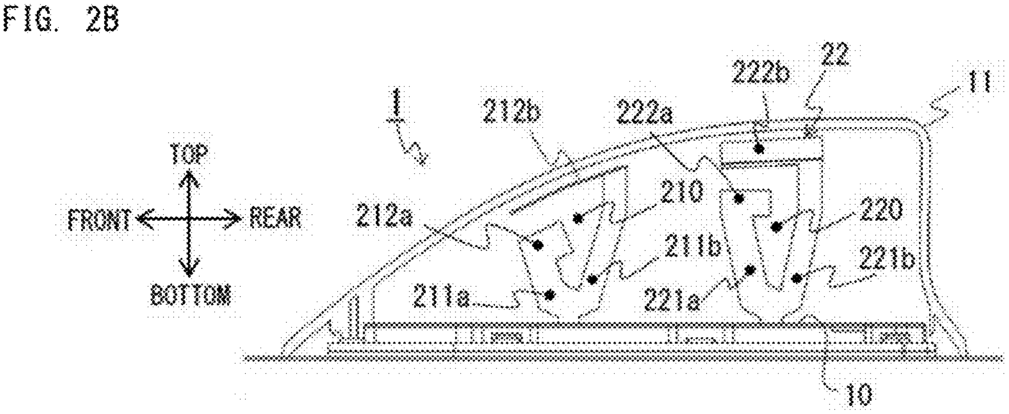
FIG. 2B is an explanatory diagram of the internal structure of the vehicular antenna device viewed from a left side.

FIG. 1A is a perspective view for explaining a main structure of a vehicular antenna device 1, as an antenna device for a vehicle, according to one embodiment. FIG. 1B is a rear view for explaining the main structure of the vehicular antenna device 1 according to the embodiment. FIG. 1C is a front view for explaining the main structure of the vehicular antenna device 1 according to the embodiment. FIG. 1D is a top view for explaining the main structure of the vehicular antenna device 1 according to the embodiment.

The vehicular antenna device 1 is mounted on, for example, a roof of a vehicle for use. In the attached drawings, the direction that the vehicle advances (direction of movement) is referred to as "front" or "front direction", the opposite direction thereof is referred to as "rear" or "rear direction", and these directions are referred to as "longitudinal direction" if no distinction is necessary between them. The right side of the direction that the vehicle advances is referred to as "right" or "right direction", the left side of the direction that the vehicle advances is referred to as "left" or "left direction", and these directions are referred to as "width direction" if no distinction is necessary between them. The direction of the gravitational force of the vehicle is referred to as "bottom" or "lower", and the opposite direction thereof is referred to as "top" or "upper".

The vehicular antenna device 1 of this embodiment includes an antenna base 10 that is attachable to a vehicle and a radio-wave transparent antenna case 11.

The antenna base 10 is substantially elliptical and is attached such that the center axis line in the longitudinal direction can be parallel to the direction of movement of the vehicle. The antenna base 10 includes a substantially elliptical resin base abutted against the part attached to the vehicle, a circuit substrate fixed onto the resin base, and a conductive base shielding electronic parts on the circuit substrate and, at the same time, functioning as a ground conductor for antenna elements 21 and 22, which are described below. The conductive base has holes at front and rear positions of a substantially center part, and contact portions in continuity with a feeding point of the circuit substrate are exposed through the holes.

The antenna case 11 is formed to have a streamline shape having a width and height that decrease toward the front and having sides having a curved surface bowed inward (toward the center axis line in the longitudinal direction) and is fitted onto an outer edge of the antenna base 10. The antenna base 10 has a length in the longitudinal direction of about 180 mm and a length in the width direction of about 70 mm. The antenna case 11 has a length in the longitudinal direction of about 204 mm, a length in the width direction of about 88 mm, and an upper height of about 64 mm.

The two antenna elements 21 and 22 are erected in the front-rear direction on the antenna base 10. Although, according to this embodiment, the front antenna elements 21 is dedicated to receive long term evolution (LTE) and the rear antenna element 22 is dedicated to transmit and/or receive LTE, for example. It is noted that the frequency bands to be used and the application of the transmission and/or reception are not limited thereto.

The two antenna elements 21 and 22 substantially have an identical basic structure though they have different shapes from each other and also different heights from the conductive base of the antenna base 10. That is, the front antenna element 21 has a proximal end portion 21*a* that projects in a direction toward the antenna base 10 and two arm portions 211*a* and 211*b* that surround a space 210 by extending in a strip shape in directions away from each other from the vicinity of the proximal end portion 21*a*. The proximal end portion 21*a* is fixed on a plane substantially perpendicular to the antenna base 10. The term "space" herein refers to an area surrounded by two arm portions (the arm portions 211*a* and 211*b* in this embodiment).

An angle formed by a part facing the antenna base 10 and extending from the proximal end portion 21*a* of the two arm portions 211*a* and 211*b* and the antenna base 10 is an acute angle. In other words, the angle is larger than 0 degrees and smaller than 90 degrees. Because of the strip shape having a larger width than that of a linear shape, two frequency bands of low and high frequencies can be widened.

The term "strip shape" herein refers to a shape having a uniform width and having a larger length of extension than the width. Although, according to this embodiment, the width is equal to substantially 3 mm or larger under constraints that the frequency bands cover the used frequency band of LTE and that the space for installing the two arm portions 211*a* and 211*b* cannot be large because they are in the vehicular antenna device, the width is preferably equal to or larger than 5 mm or is more preferably equal to or larger than 7 mm if the above constraints need not be considered.

The arm portions 211*a* and 211*b* may have a width that increases serially or stepwise from the sides close to the proximal end portion 21*a* toward their tips or may have a uniform width.

Viewing a virtual line in a vertical direction from the proximal end portion 21*a* as a boundary line, one of the two arm portions 211*a* and 211*b* has an area larger than the area of the other one. The arm portion 211*a* has an open end 212*a* as its tip, and the arm portion 211*b* has an open end 212*b* as its tip.

The term "open end" herein refers to a part where no other conductor or the like exists at a tip of the end.

The open end 212*a* of the front arm portion 211*a* projects toward a direction of a wide region of the space 210, and the open end 212*b* of the rear arm portion 211*b* projects to the front and has a distance to ground that decreases toward the front to follow an inner wall of the antenna case 11. The open end 212*b* of the rear arm portion 211*b* bends down substantially in parallel with the antenna base 10 to load capacitance to ground while securing radiation resistance. The two open ends 212*a* and 212*b* are disposed closely to form an opening of the space 210 toward a front and lower part.

The proximal end portion 21*a,* the arm portions 211*a* and 211*b,* and the open ends 212*a* and 212*b* are formed by hollowing (or cutting off), for example, one metal plate to a predetermined shape, which is described below. Thus, the proximal end portion 21*a* and the two arm portions 211*a* and 211*b* are disposed on an identical plane.

The proximal end portion 21*a* is mounted and fixed at the above-described contact portion at the front of the substantially center part exposed from the antenna base 10 so as to also function as a feeding part of the two arm portions 211*a* and 211*b*. Thus, the two arm portions 211*a* and 211*b* and the open ends 212*a* and 212*b* can be operated as an antenna. The arm portion 211*a* and the open end 212*a* or the arm portion 211*b* and the open end 212*b* may be operated as an individual antenna.

In this way, since the two arm portions 211*a* and 211*b* and the open ends 212*a* and 212*b* are operated as antennas with one feeding part, an operating band equal to or higher than 1930 MHz can be acquired. Therefore, the use in, for example, 1930 MHz to 2360 MHz of an LTE band is enabled.

Since the two arm portions 211*a* and 211*b* and the open ends 212*a* and 212*b* are operated as antennas with one feeding part, an operating band of 800 MHz to 1100 MHz can be acquired. For example, the use in 714 MHz to 894 MHz of an LTE band is enabled by providing a matching circuit and adjusting a circuit constant thereof to a proper value.

The rear antenna element 22 has a proximal end portion 22*a* that projects in a direction toward the antenna base 10 and two arm portions 221*a* and 221*b* that surround a space 220 by extending in a strip shape in directions away from each other from the vicinity of the proximal end portion 22*a*. The proximal end portion 22*a* is fixed on a plane substantially perpendicular to the antenna base 10. The arm portion 221*a* has an open end 222*a* as its tip, and the arm portion 221*b* has an open end 222*b* as its tip.

The open end 222*a* of the front arm portion 221*a* projects toward a direction of a wide region of the space 220, and the open end 222*b* of the rear arm portion 221*b* projects to the front to follow the inner wall of the antenna case 11. A part of the open end 222*b* of the rear arm portion 221*b* bends down by an angle of substantially 30 degrees with respect to the antenna base 10 to reduce capacitance to ground while securing radiation resistance. The two open ends 222*a* and 222*b* are disposed closely to form an opening of the space 220 toward a front and horizontal direction. The opening direction of the opening is different from the opening direction of the opening of the space 210 in the front antenna element 21. This is for increasing isolation caused by the proximity of the two antenna elements 21 and 22. This is described below.

The proximal end portion 22*a,* the arm portions 221*a* and 221*b,* and the open ends 222*a* and 222*b* are formed by hollowing (or cutting off), for example, one metal plate to a predetermined shape, which is described below. Thus, the proximal end portion 22*a* and a part of the two arm portions 221*a* and 221*b* and the open ends 222*a* and 222*b* are disposed on an identical plane.

The proximal end portion 22*a* is mounted and fixed at the above-described contact portion at the rear of the substantially center part exposed from the antenna base 10 so as to also function as a feeding part of the two arm portions 211*a* and 221*b*. Thus, the two arm portions 221*a* and 221*b* and the open ends 222*a* and 222*b* can be operated as antennas. The arm portion 221*a* and the open end 222*a* or the arm portion 221*b* and the open end 222*b* may be operated as an individual antenna.

In this way, since the two arm portions 221*a* and 221*b* and the open ends 222*a* and 222*b* are operated as antennas with one feeding part, an operating band equal to or higher than 1600 MHz can be acquired. Therefore, the use in, for example, 1710 MHz to 2360 MHz of an LTE band is enabled.

Since the two arm portions 221*a* and 221*b* and the open ends 222*a* and 222*b* are operated as antennas with one feeding part, an operating band of 800 MHz to 1100 MHz can be acquired. For example, the use in 699 MHz to 894 MHz of an LTE band is enabled by providing a matching circuit and adjusting a circuit constant thereof to a proper value.

Although, in the example shown in FIGS. 1A to 1D and FIGS. 2A and 2B, the interval between the arm portions 211*a* and 211*b* and the interval between the arm portions 221*a* and 221*b* gradationally increase as the distances from the feeding part increase, the intervals may remain the same in a predetermined section from the feeding part and increase after the predetermined section.

In order to describe reasons why the antenna elements 21 and 22 according to this embodiment have the shapes and structures as shown in FIGS. 1A to 1D and FIGS. 2A and 2B are adopted, experiment results regarding antenna characteristics of several comparative elements and modification elements of this embodiment that operate in low and high frequency bands of LTE are described first.

Figure 3A:
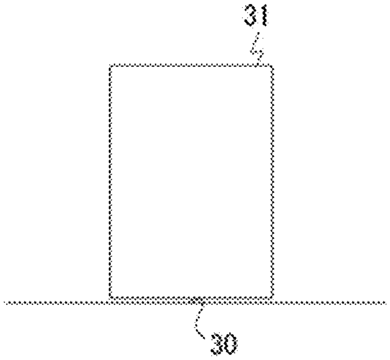
FIG. 3A is a schematic diagram of a first comparative element.
Figure 3B:
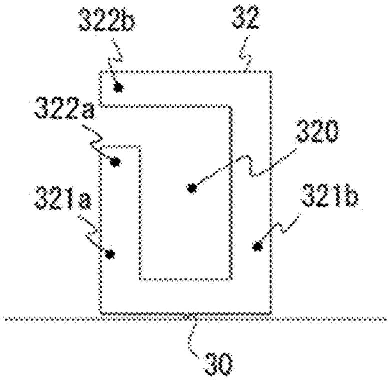
FIG. 3B is a schematic diagram of a second comparative element.

FIG. 3A is a schematic diagram of a first comparative element 31. The first comparative element 31 has a quadrangle conductor having a feeding part 30 on one side. FIG. 3B is a schematic diagram of a second comparative element 32. The second comparative element 32 has a strip-shaped conductor having a substantially equal width and having the feeding part 30 at a part thereof. The second comparative element 32 is formed by hollowing (or cutting off) the quadrangle conductor of the first comparative element 31 and has a substantially quadrangle outer shape. In other words, the material of the second comparative element 32 is the same as that of the first comparative element 31, and the second comparative element 32 has an outer shape that is substantially the same as that of the first comparative element 31. The strip-shaped conductor of the second comparative element 32 includes two arm portions 321*a* and 321*b* extending from the feeding part 30 so as to surround a space 320, and the arm portion 321*a* has an open end 322*a* as its tip, and the arm portion 321*b* has an open end 322*b* as its tip.

The term "outer shape" herein refers to a shape acquired by connecting the outermost vertices of an antenna element. For example, the shape of a comparative element that is not cut off is the "outer shape".

Figure 4:
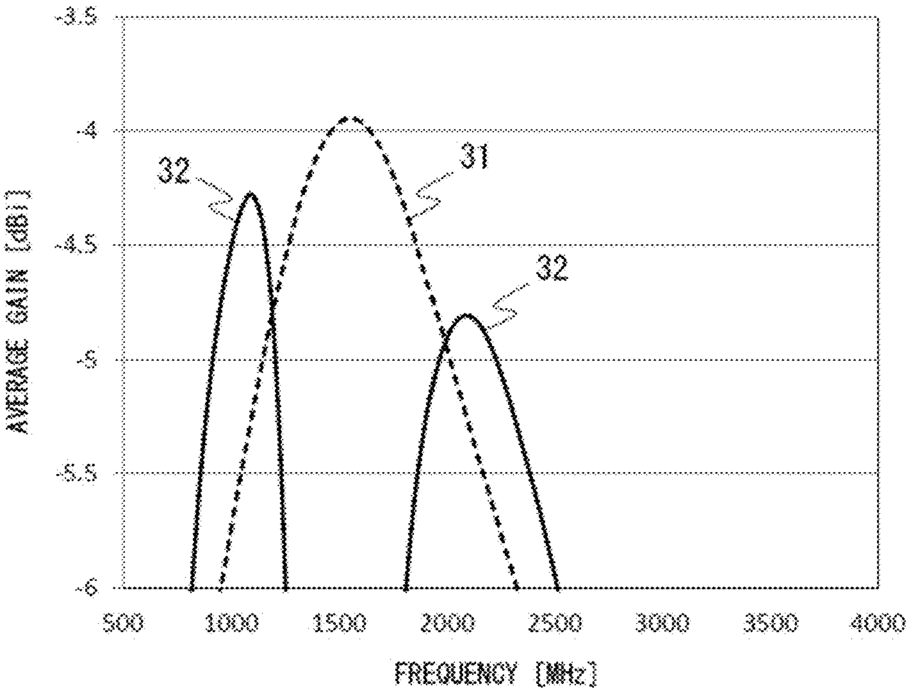
FIG. 4 shows an average gain profile against vertically polarized frequencies on a horizontal plane when the first and second comparative elements are installed on a 1-m circular ground plate.

FIG. 4 shows an average gain profile against vertically polarized frequencies on a horizontal plane when these comparative elements 31 and 32 are installed on a 1-m circular ground plate. FIG. 4 has a vertical axis indicating average gain (dBi) and a horizontal axis indicating frequency (MHz). As shown in FIG. 4, only one frequency band can be used as an antenna with the first comparative element 31. Additionally, the frequency band is displaced from the frequency often used in LTE. On the other hand, low and high frequency bands of LTE can be used with the second comparative element 32, but the usable bands may not be always sufficient for LTE applications using a wide frequency band though they are wide to some extent.

Figure 5A:
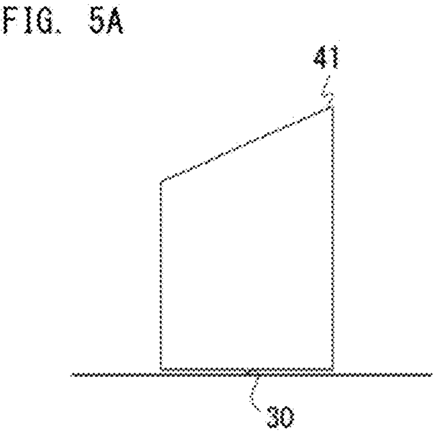
FIG. 5A is a schematic diagram of a third comparative element.
Figure 5B:
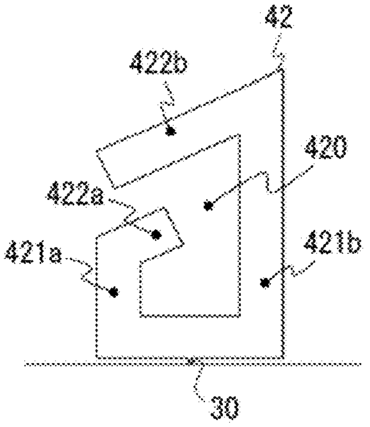
FIG. 5B is a schematic diagram of a fourth comparative element.

FIG. 5A is a schematic diagram of a third comparative element 41. The third comparative element 41 has a trapezoidal conductor having the feeding part 30 at one side thereof. FIG. 5B is a schematic diagram of a fourth comparative element 42. The fourth comparative element 42 has a strip-shaped conductor having the feeding part 30 at a part thereof. The fourth comparative element 42 is formed by hollowing (or cutting off) the third comparative element 41 to form a substantially trapezoidal outer shape. In other words, the material of the fourth comparative element 42 is the same as that of the third comparative element 41, and the fourth comparative element 42 has an outer shape that is substantially the same as that of the third comparative element 41. The strip-shaped conductor of the fourth comparative element 42 includes two arm portions 421*a* and 421*b* extending from the feeding part 30 so as to surround a space 420. The arm portions 421*a* and 421*b* have open ends 422*a* and 422*b*, respectively, as their tips.

Figure 6:
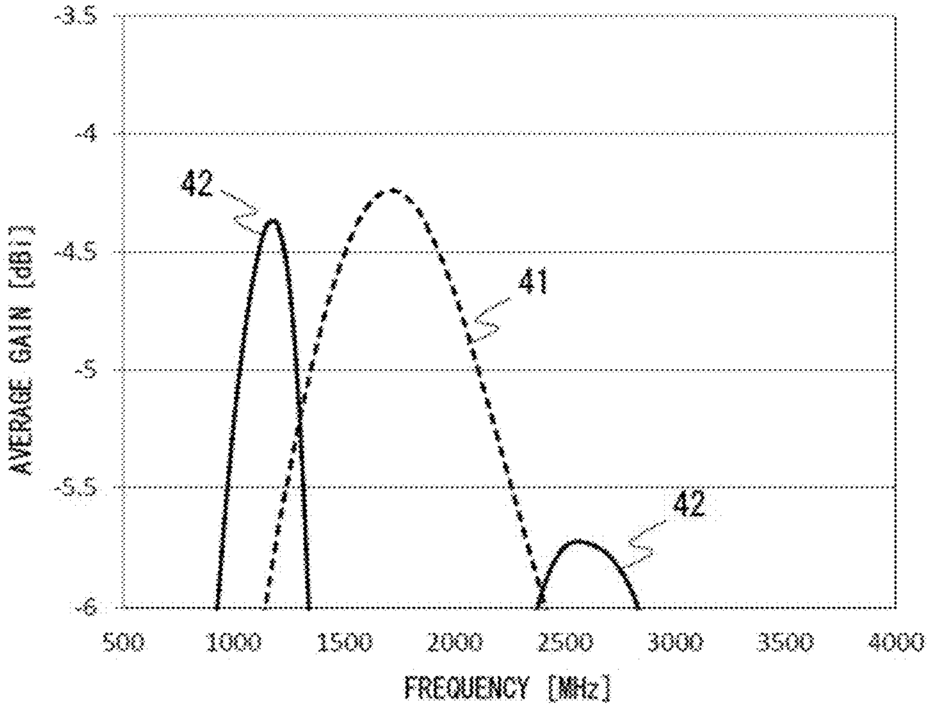
FIG. 6 shows an average gain profile against vertically polarized frequencies on a horizontal plane when the third and fourth comparative elements are installed on a 1-m circular ground plate.

FIG. 6 shows an average gain profile against vertically polarized frequencies on a horizontal plane when these comparative elements 41 and 42 are installed on a 1-m circular ground plate. FIG. 6 has a vertical axis indicating average gain (dBi) and a horizontal axis indicating frequency (MHz). As shown in FIG. 6, only one frequency band can be used as an antenna with the third comparative element 41. On the other hand, low and high frequency bands of LTE can be used with the fourth comparative element 42, but the usable bands may not be sufficient as bands to be used by the LTE frequency bands. Additionally, the antenna gains are lower than those of the first and second comparative elements 31 and 32.

Figure 7A:
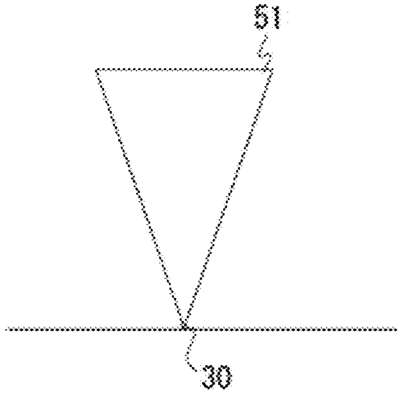
FIG. 7A is a schematic diagram of a fifth comparative element.
Figure 7B:
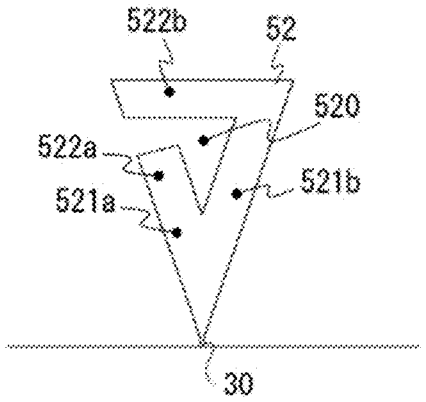
FIG. 7B is a schematic diagram of a first modification element of the embodiment.

FIG. 7A is a schematic diagram of a fifth comparative element 51. The fifth comparative element 51 has an inverted triangular conductor having the feeding part 30 at its vertex part. FIG. 7B is a schematic diagram of a first modification element 52 of the embodiment. The first modification element 52 has a strip-shaped conductor having the feeding part 30 at its vertex part. The first modification element 52 is formed by hollowing (or cutting off) the fifth comparative element 51 to form a substantially inverted triangular outer shape. In other words, the material of the first modification element 52 is the same as that of the fifth comparative element 51, and the first modification element 52 has an outer shape that is substantially the same as that of the fifth comparative element 51. The strip-shaped conductor of the first modification element 52 includes two arm portions 521*a* and 521*b* extending from the feeding part 30 so as to surround a space 520. The arm portion 521*a* has an open end 522*a* as its tip, and the arm portion 521*b* has an open end 522*b* as its tip. An angle formed by a part facing the antenna base and extending away from the feeding part 30 of the strip-shaped conductor and the antenna base is substantially 70 degrees.

Figure 8:
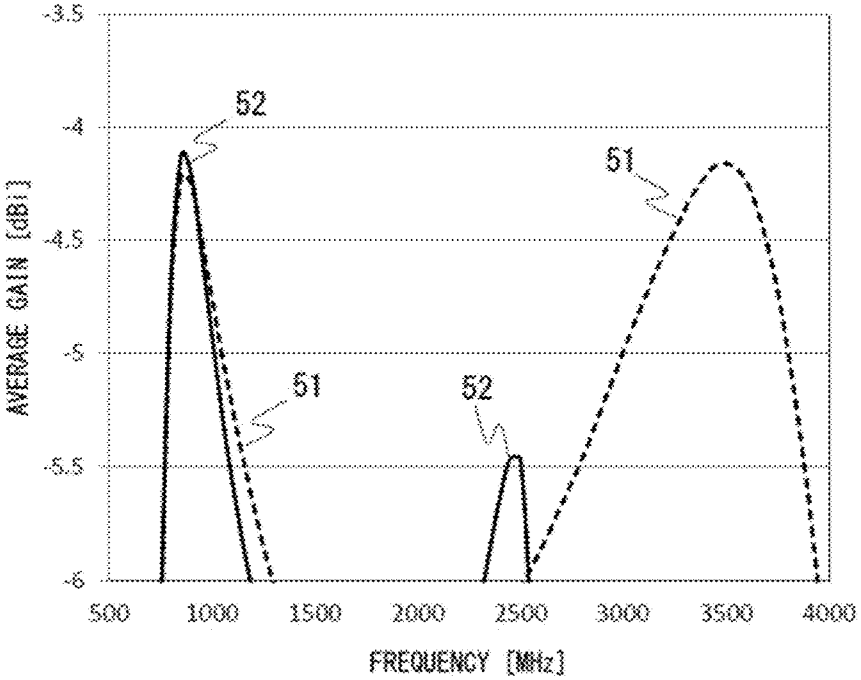
FIG. 8 shows an average gain profile against vertically polarized frequencies on a horizontal plane when the fifth comparative element and the first modification element of the embodiment are installed on a 1-m circular ground plate.

FIG. 8 shows an average gain profile against vertically polarized frequencies on a horizontal plane when the fifth comparative element 51 and the first modification element 52 are installed on a 1-m circular ground plate. FIG. 8 has a vertical axis indicating average gain (dBi) and a horizontal axis indicating frequency (MHz). As shown in FIG. 8, two frequency bands can be used as antennas with the fifth comparative element 51 and are displaced from the frequency band that is often used by LTE though the operating band is wide in the high frequency band. On the other hand, with the first modification element 52, the operating band is narrow in the low frequency band of LTE, and the average gain is small in the high frequency band of LTE.

Figure 9A:
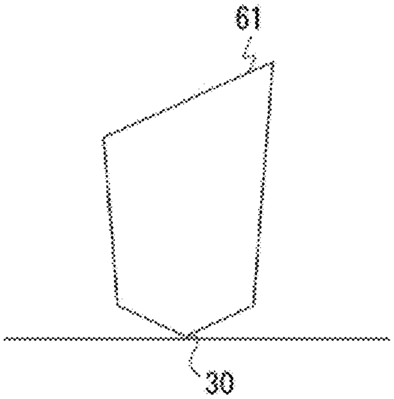
FIG. 9A is a schematic diagram of a sixth comparative element.
Figure 9B:
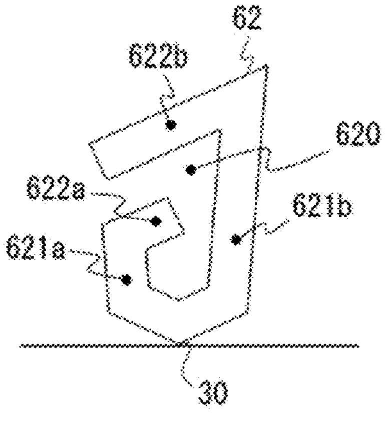
FIG. 9B is a schematic diagram of a second modification element of the embodiment.

FIG. 9A is a schematic diagram of a sixth comparative element 61. The sixth comparative element 61 has a composite conductor of an inverted triangle and a trapezoid and has the feeding part 30 at its vertex part. An angle formed by a part facing the antenna base and extending away from the feeding part 30 of the conductor and the antenna base is substantially 25 degrees. FIG. 9B is a schematic diagram of a second modification element 62 of the embodiment. The second modification element 62 has a strip-shaped conductor having the feeding part 30 at its vertex part. The second modification element 62 is formed by hollowing (or cutting off) the sixth comparative element 61 to form an outer shape combining a substantially inverted-triangular shape and a substantially trapezoidal shape. The material of the second modification element 62 is the same as that of the sixth comparative element 61, and the second modification element 62 has an outer shape that is substantially the same as that of the sixth comparative element 61. The strip-shaped conductor of the second modification element 62 has two arm portions 621*a* and 621*b* extending in a strip shape in directions away from each other from the feeding part 30 so as to surround a space 620. The distances between the arm portions 621*a* and 621*b* and the antenna base 10 also gradually increase as the extension increases. The arm portions 621*a* and 621*b* have open ends 622*a* and 622*b*, respectively, as their tips, and the part where they face is an opening of the space 620. An angle formed by a part facing the antenna base and extending away from the feeding part 30 of the second modification element 62 and the antenna base is substantially 25 degrees.

Figure 10:
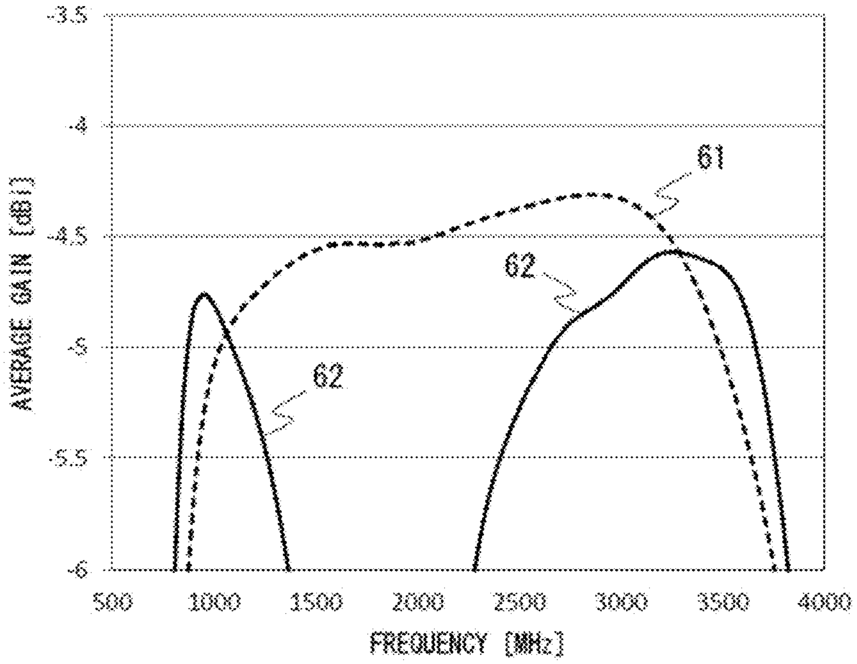
FIG. 10 shows an average gain profile against vertically polarized frequencies on a horizontal plane when the sixth comparative element and the second modification element of the embodiment are installed on a 1-m circular ground plate.

FIG. 10 shows an average gain profile against vertically polarized frequencies on a horizontal plane when the sixth comparative element 61 and the second modification element 62 are installed on a 1-m circular ground plate. FIG. 10 has a vertical axis indicating average gain (dBi) and a horizontal axis indicating frequency (MHz). As shown in FIG. 10, although one frequency band can be used as an antenna with the sixth comparative element 61, the frequency band is as wide as about 900 MHz to about 3700 MHz. However, the sixth comparative element 61 cannot be used at a frequency lower than about 800 MHz of LTE and higher than 3700 MHz. On the other hand, with the second modification element 62, the frequency that can be used with a certain or higher antenna gain can extend to a lower frequency as the lower frequency band and can extend to a higher frequency as the high frequency band.

This may be because the arm portions 621*a* and 622*a* are strip-shaped and because the inductance L depending on the distance from the conductive base of the antenna base 10 to the arm portions 621*a* and 621*b* gradually increases in the low frequency band, lowering the usable frequency ($f=1/(2\pi\sqrt{(LC)})$) as a result. On the other hand, it may be because the inductance L is small in the high frequency band and the usable frequency is high.

According to this embodiment, the second modification element 62 operating as described above is adopted as the front antenna element 21. Thus, compared with, for example, the sixth comparative element 61, the frequency usable with a certain or higher antenna gain can be lower in the low frequency band and can be higher in the high frequency band. In a case where the second modification element 62 is used as the antenna element 21, the width of the arm portions 621*a* and 621*b* may be changed, or a part of the open end 622*b* may be bent down as shown in FIGS. 1 and 2. The bending does not lower the antenna gain if the area is equal.

Figure 11A:
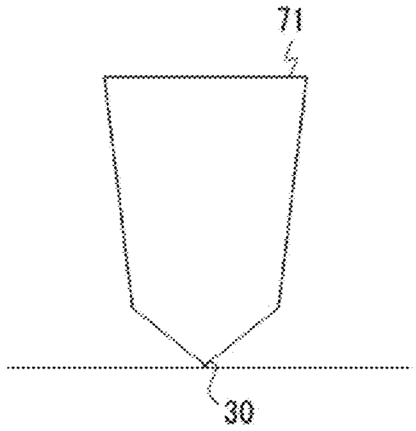
FIG. 11A is a schematic diagram of a seventh comparative element.
Figure 11B:
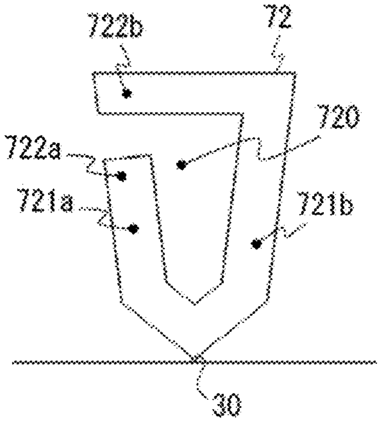
FIG. 11B is a schematic diagram of a third modification element of the embodiment.

FIG. 11A is a schematic diagram of a seventh comparative element 71. The seventh comparative element 71 has a composite conductor of an inverted triangle and a trapezoid and has the feeding part 30 at its vertex part. An angle formed by a part facing the antenna base and extending away from the feeding part 30 of the conductor and the antenna base is substantially 35 degrees. FIG. 11B is a schematic diagram of a third modification element 72 of the embodiment. The third modification element 72 has a strip-shaped conductor having the feeding part 30 at its vertex part. The third modification element 72 is formed by hollowing (or cutting off) the seventh comparative element 71 and has an outer shape combining a substantially inverted-triangular shape and a substantially trapezoidal shape. The size of the outer shape is substantially equal to that of the seventh comparative element 71 and has two arm portions 721*a* and 721*b* extending in a strip shape in directions away from each other from the feeding part 30 so as to surround a space 720. The distances between the arm portions 721*a* and 721*b* and the antenna base 10 also gradually increase as the extension increases. The arm portion 721*a* has an open end 722*a* as its tip, and the arm portion 721*b* has an open end 722*b* as its tip. A gap between the open end 722*a* and the open end 722*b* is an opening of the space 720. An angle formed by a part facing the antenna base and extending away from the feeding part 30 of the third modification element 72 and the antenna base is substantially 35 degrees.

Figure 12:
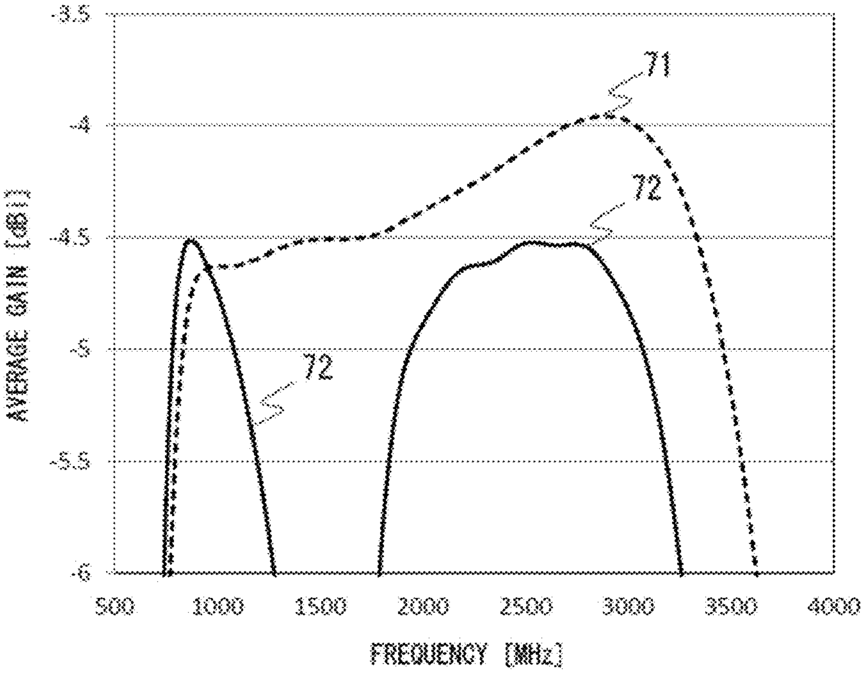
FIG. 12 shows an average gain profile against vertically polarized frequencies on a horizontal plane when the seventh comparative element and the third modification element of the embodiment are installed on a 1-m circular ground plate.

FIG. 12 shows an average gain profile against vertically polarized frequencies on a horizontal plane when the seventh comparative elements 71 and the third modification element 72 are installed on a 1-m circular ground plate. FIG. 12 has a vertical axis indicating average gain (dBi) and a horizontal axis indicating frequency (MHz). As shown in FIG. 12, with the seventh comparative element 71, although one frequency band can be used as an antenna, the usable frequency is a wide frequency of about 900 MHz to about 3600 MHz. However, it cannot be used at frequencies lower than about 800 MHz of LTE. On the other hand, with the third modification element 72, the usable frequency extends to a lower frequency in the low frequency band. However, compared with the above-described second modification element 62, the high frequency band is displaced to the low frequency band by about 600 MHz. This is because the arm portion 721*a* is longer than the arm portion 621*a*. Accordingly, in this embodiment, the arm portion 721*a* is adopted as the rear antenna element 22 by adjusting the length of the arm portion 721*a* to support a desired frequency band.

In this way, according to this embodiment, the strip-shaped conductors of the second modification element 62 and the third modification element 72 have, for example, the two arm portions 211*a* and 211*b* and the open ends 212*a* and 212*b* caused to extend in directions away from each other from the feeding part 30 and also to be away from the conductive base of the antenna base 10. Thus, the arm portion 211*a* has a lower inductance L than that of a planer conductor having the same material and outer shape, and the arm portion 211*b* has a higher inductance L than that of the planer conductor having the same material and outer shape, so that two frequency bands of a low frequency band and a high frequency band of, for example, LTE are generated by the one antenna element.

By increasing the area of the arm portions (including the open ends 212*a* and 212*b*), the capacitance to ground can be increased, and the resonance frequency can be reduced. Since a part or all of the open ends 322*a*, 322*b*, 422*a*, 422*b*, 522*a*, 522*b*, 622*a*, 622*b*, 722*a*, and 722*b* may be properly bent down in accordance with the shape of the inner wall of the antenna case 11, extended variations of the design can be achieved.

Since the planer conductors of the first comparative element 31, the third comparative element 41, the fifth comparative element 51, the sixth comparative element 61 and the seventh comparative element 71 are hollowed (or cut off) to acquire the second comparative element 32, the fourth comparative element 42, the first modification element 52, the second modification element 62 and the third modification element 72 each having a strip-shaped conductor surrounding a predetermined space so that, for example, the processes for manufacturing the modification elements 52, 62, and 72 can be simplified.

According to this embodiment, since the two antenna elements 21 and 22 are erected on the antenna base, the isolation between the elements is often problematic. Although the interval between the strip-shaped conductors may have a length that suppresses interference of used frequencies, the isolation can also be increased by properly adjusting the opening directions of the openings of the spaces surrounded by the strip-shaped conductors as shown in FIG. 13A to FIG. 13D.

Figure 13A:
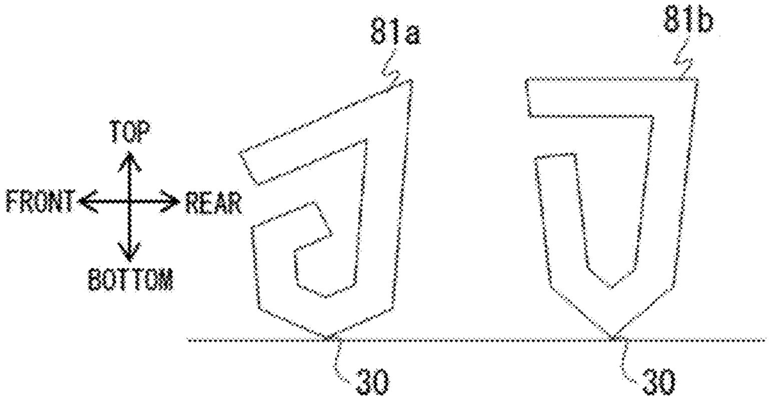
FIG. 13A is a schematic diagram of a variation of arrangement of two antenna elements.
Figure 13B:
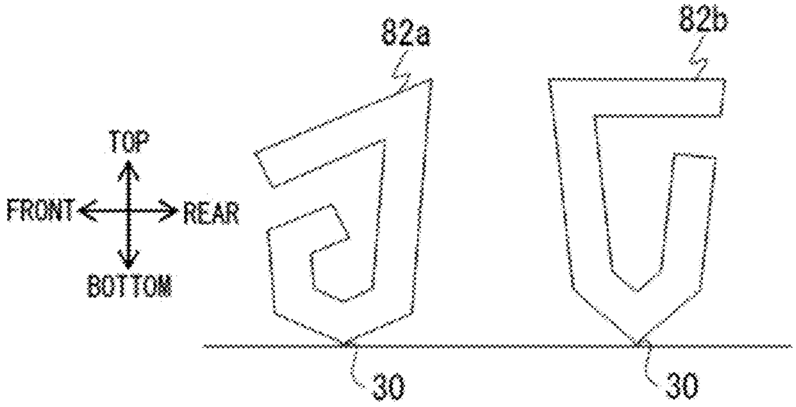
FIG. 13B is a schematic diagram of a variation of arrangement of two antenna elements.
Figure 13C:
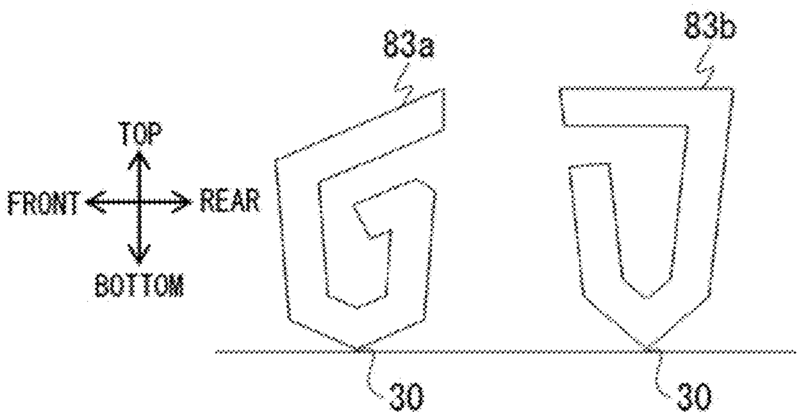
FIG. 13C is a schematic diagram of a variation of arrangement of two antenna elements.
Figure 13D:
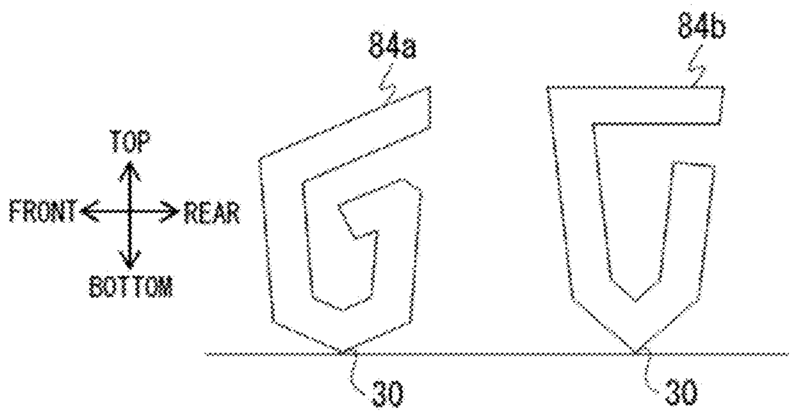
FIG. 13D is a schematic diagram of a variation of arrangement of two antenna elements.

FIG. 13A shows a first example in which the direction of an opening of a front antenna element 81*a* is a front lower direction, and the direction of an opening of a rear antenna element 81*b* is a front and horizontal direction. FIG. 13B shows a second example in which the direction of an opening of a front antenna element 82*a* is a direction toward a front and lower direction, and the direction of an opening of a rear antenna element 82*b* is a rear and horizontal direction. FIG. 13C shows a third example in which the direction of an opening of a front antenna element 83*a* is a rear and upper direction, and the direction of an opening of a rear antenna element 83*b* is a front and horizontal direction. FIG. 13D shows a fourth example in which the direction of an opening of a front antenna element 84*a* is a rear and upper direction, and the direction of an opening of a rear antenna element 84*b* is a rear and horizontal direction.

The directions of openings in all of the examples do not agree with the directions of the openings of the other elements.

Figure 14:
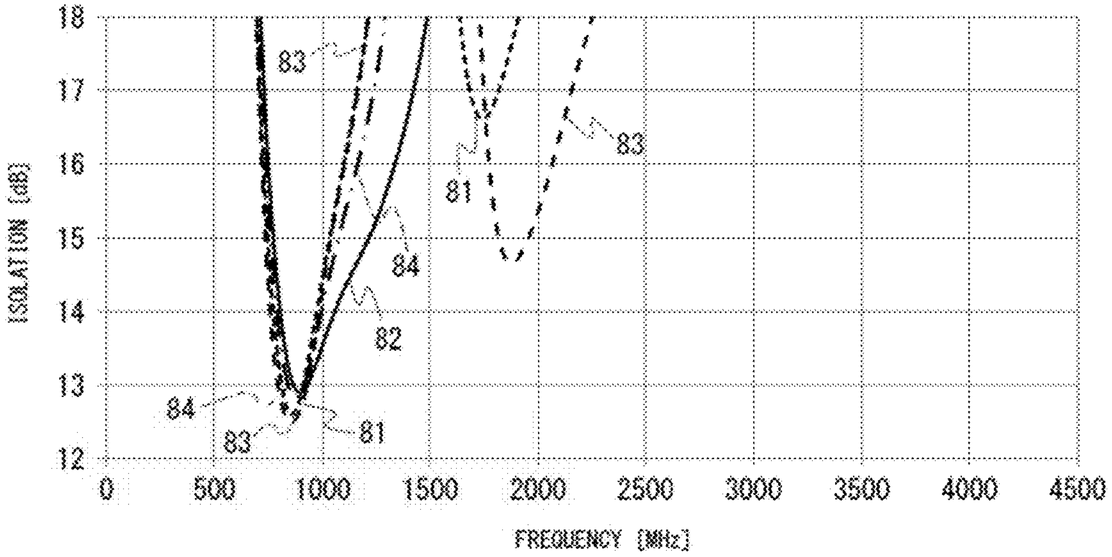
FIG. 14 shows isolation curves with the arrangement examples in FIGS. 13A to 13D.

FIG. 14 is an isolation characteristic diagram of the first to fourth examples. FIG. 14 has a vertical axis indicating isolation (dB) and a horizontal axis indicating frequency (MHz). In FIG. 14, a short dashed line 81 represents an isolation in the case of the first example, a solid line 82 represents an isolation in the case of the second example, a long dashed line 83 represents an isolation in the case of the third example, and an alternate long and short dashed line represents an isolation in the case of the fourth example.

In this way, although, with any of the combinations, a sufficient isolation is obtained in either of the low frequency band and the high frequency band of LTE, the isolation of the second example represented by the solid line 82 has the best characteristic in the low frequency band (around 900 MHz).

The widths of the arm portions 211*a*, 211*b*, 221*a* and 221*b* may be the narrowest at the proximal end portions 21*a* and 22*a* and may increase in a tapered shape as the distances from the proximal end portions 21*a* and 22*a* increase. For example, an incision may be provided at a part of the arm portions 211*a*, 211*b*, 221*a*, 221*b* and so on and the open ends 212*a*, 212*b*, 222*a*, and 222*b*.

The antenna elements 21 and 22 can have a shape other than the shape examples described according to this embodiment. The antenna elements 21 and 22 may have, for example, a substantial V shape, a substantial U shape, a substantial C shape, or a substantial G shape.

As described above, since each of the two antenna elements 21 and 22 according to this embodiment includes two arm portions having different shapes (at least one of its outer shape and length) as one element, the two antenna elements 21 and 22 can be operated in two of high and low frequency bands of, for example, LTE. However, as shown in, for example, FIG. 10 and FIG. 12, the two antenna elements 21 and 22 have an average gain of −6 dBi or lower around 1500 MHz to around 2000 MHz. Also, as shown in FIG. 14, a significantly large isolation between two frequencies in the low and high frequency bands of LTE is acquired around 1500 MHz. Thus, for example, even in a case where a GNSS antenna that receives, for example, an L1 signal in the 1575.42 MHz band is provided closely to the vehicular antenna device 1 of this embodiment (or even they are bundled in the antenna case 11), the interference between the GNSS antenna and the two antenna elements 21 and 22 can be avoided.

According to this embodiment, the cases have been described where the angle formed by the part facing the antenna base 10 and extending from the proximal end portion 21*a* of the two arm portions 211*a* and 211*b* and the antenna base 10 is an acute angle. The influence of the difference in angle given to the antenna characteristic is described below.

More specifically, changes in antenna characteristic (such as frequency band) caused when the angle is variously changed are described by using the above-described first modification element 52, second modification element 62, third modification element 72 and first comparative element 31 to seventh comparative element 71. In this case, it is assumed that the materials of the modification elements and the comparative elements are the same. The angle formed by the part facing the antenna base 10 and extending from the proximal end portion of the two arm portions 211*a* and 211*b* and the antenna base 10 is referred to as "extension angle" for convenience of description.

First, an influence of the extension angle of an element with no arm portion given to the antenna characteristic is described. Here, comparison examples among the first comparative element 31, the fifth comparative element 51, and the seventh comparative element 71 are described.

The extension angle of the first comparative element 31 is 0 degrees, the extension angle of the seventh comparative element 71 is substantially 35 degrees, and the extension angle of the fifth comparative element 51 is substantially 70 degrees.

While the frequency band (hereinafter, "operating band") with which the first comparative element 31 can operate as an antenna is about 1000 MHz to about 2300 MHz as shown in FIG. 4, the operating band of the seventh comparative element 71 is about 900 MHz to about 3600 MHz as shown in FIG. 12. In this way, as the extension angle increases from 0 degrees, the operating band is widened. This is due to the radiation efficiency improved when the extension angle exceeds 0 degrees because the extending part operates as a travelling-wave antenna.

However, an excessively large extension angle affects the operating band. For example, as shown in FIG. 8, the operating band of the fifth comparative element 51 is about 800 MHz to 1300 MHz on the low frequency side of LTE and is about 2500 MHz to 4000 MHz on the high frequency side of LTE. Comparing with the seventh comparative element 71 with an extension angle of substantially 35 degrees, the larger extension angle of the fifth comparative element 51 improves the radiation efficiency on the high frequency side, which widens the operating band on the high frequency side while narrowing the operating band on the low frequency side.

In this way, the operating band is widened when the extension angle is substantially 35 degrees, compared with the case where the extension angle is 0 degrees. On the other hand, the operating band is widened when the extension angle is substantially 70 degrees compared with the case where the extension angle is 0 degrees but is narrowed compared with the case where the extension angle is substantially 35 degrees.

Next, an influence of the extension angle of an element having arm portions given to the antenna characteristic is described. Here, comparison examples among the second comparative element 32, the third modification element 72, and the first modification element 52 are described.

The extension angle of the second comparative element 32 is 0 degrees, the extension angle of the third modification element 72 is substantially 35 degrees, and the extension angle of the first modification element 52 is substantially 70 degrees. The operating band of the second comparative element 32 is about 800 MHz to about 1200 MHz on the low frequency side of LTE and is about 1800 MHz to about 2500 MHz on the high frequency side of LTE, as shown in FIG. 4. On the other hand, the operating band of the third modification element 72 is about 750 MHz to about 1300 MHz on the low frequency side of LTE and is about 1800 MHz to about 3300 MHz on the high frequency side of LTE, as shown in FIG. 12. In this way, when the extension angle exceeds 0 degrees, the operating band is widened.

However, an excessively large extension angle affects the operating band, similarly to the element with no arm portion. For example, as shown in FIG. 8, the operating band of the first modification element 52 is about 750 MHz to about 1200 MHz on the low frequency side of LTE and is about 2300 MHz to about 2500 MHz on the high frequency side of LTE. While the extension angle of the first modification element 52 is larger than that of the third modification element 72, the operating band is narrowed.

In this way, while the operating band is widened when the extension angle is substantially 35 degrees compared with the case where the extension angle is 0 degrees, the operating band is narrowed when the extension angle is substantially 70 degrees compared with the case where the extension angle is substantially 35 degrees.

Similarly, an influence of an extension angle of an element with no arm portion given to an antenna characteristic is described by comparing the third comparative element 41 and the sixth comparative element 61. The extension angle of the third comparative element 41 is 0 degrees, and the extension angle of the sixth comparative element 61 is substantially 25 degrees. While the operating band of the third comparative element 41 is about 1000 MHz to about 2500 MHz, the operating band of the sixth comparative element 61 is about 900 MHz to about 3700 MHz. In this way, when the extension angle exceeds 0 degrees, the operating band is widened.

An influence of an extension angle of an element having arm portions given to an antenna characteristic is described by comparing the fourth comparative element 42 and the second modification element 62. The extension angle of the fourth comparative element 42 is 0 degrees, and the extension angle of the second modification element 62 is substantially 25 degrees. The operating band of the fourth comparative element 42 is about 1000 MHz to about 1200 MHz on the low frequency side of LTE and is about 2400

MHz to about 2700 MHz on the high frequency side of LTE. On the other hand, the operating band of the second modification element 62 is about 900 MHz to about 1400 MHz on the low frequency side of LTE and is about 2300 MHz to about 3800 MHz on the high frequency side of LTE. In this way, when the extension angle exceeds 0 degrees, the radiation efficiency of the high frequency side of LTE is improved, and the operating band is widened. Also, since the radiation efficiency of the second modification element 62 is improved more than the fourth comparative element 42, the gain on the high frequency side of LTE improves.

As described above, the operating band can be widened when the extension angle is an acute angle greater than 0 degrees. Having described the examples where, according to this embodiment, the extension angles are substantially 25 degrees, substantially 35 degrees and substantially 70 degrees, the experiment by the present inventor et al. shows that the extension angle may be an angle other than those described above, such as substantially 15 degrees to substantially 25 degrees, substantially 30 degrees, or substantially 35 degrees to substantially 65 degrees, and is preferably substantially 15 degrees to substantially 45 degrees, in accordance with a desired operating band.

Having described that, according to this embodiment, the two antenna elements 21 and 22 have different shapes from each other and have different heights from the conductive base of the antenna base 10, embodiments of the present invention are not limited thereto. For example, when the antenna case 11 does not have a streamline shape, for example, the two antenna elements may have an identical shape in accordance with the height and shape of the case accommodating the two antenna elements.

Having described the case where, according to this embodiment, the extension angles of the two arm portions of each of the two antenna elements 21 and 22 are substantially equal, embodiments of the present invention are not limited thereto. For example, the extension angles of two arm portions of at least one of the two antenna elements 21 and 22 may be different.

Having described the embodiment by assuming that the lengths of the elements are adjusted in accordance with a desired operating band, embodiments of the present invention are not limited thereto. For example, in accordance with a desired operating band, only the extension angles may be adjusted, or the extension angles and the lengths of the elements may be adjusted.

The invention claimed is:

1. An antenna device to be mounted on a vehicle, comprising:

an antenna base; and first and second antenna elements erected on the antenna base, wherein each of the first and second antenna elements includes a proximal end portion fixed to the antenna base, and two arm portions extending in a strip shape in directions away from each other from the proximal end portion and having lengths that are different from each other, wherein the two arm portions of each of the first and second antenna elements have a corresponding interval therebetween that increases as a distance from a vicinity of the corresponding proximal end portion increases and forms an opening of a space, wherein a shorter arm portion of the two arm portions of each of the first and second antenna elements has a corresponding open end at a farthest part from the proximal end portion, the open end of each shorter arm portion extending toward a respective longer arm portion of the two arm portions, wherein the open end of the shorter arm portion of the first antenna element protrudes from a corresponding shorter arm portion main body so as to be substantially parallel to the antenna base, wherein the open end of the shorter arm portion of the second antenna element protrudes from a corresponding shorter arm portion main body so as to form a first acute angle relative to the antenna base, wherein the longer arm portion of each of the first and second antenna elements has a corresponding open end at a farthest part from the proximal end portion, the open end of each longer arm portion extending in a forward direction toward the shorter arm portion, wherein the open end of the longer arm portion of the first antenna element protrudes from a corresponding longer arm portion main body so as to be substantially parallel to the antenna base, wherein the open end of the longer arm portion of the second antenna element protrudes from a corresponding longer arm portion main body so as to form a second acute angle relative to the antenna base, wherein the shorter arm portion of the first antenna element is folded to form an acute angle facing the antenna base along an entire length of the shorter arm portion of the first antenna element, and wherein the longer arm portion of the second antenna element is formed as a flat surface facing the antenna base.

2. The antenna device according to claim 1, wherein the interval of each of the first and second antenna elements increases as the distance from the vicinity of the corresponding proximal end portion increases and forms an opening of a space, and wherein opening directions of the openings of each of the first and second antenna elements are the same.

3. The antenna device according to claim 1, wherein the open end of the first antenna element faces in the same direction as the open end of the second antenna element.

4. The antenna device according to claim 1, wherein the open end of the first antenna element faces in an opposite direction as the open end of the second antenna element.

* * * * *